Sept. 2, 1952 J. R. OISHEI 2,608,707
WINDSHIELD CLEANER
Filed Nov. 8, 1949
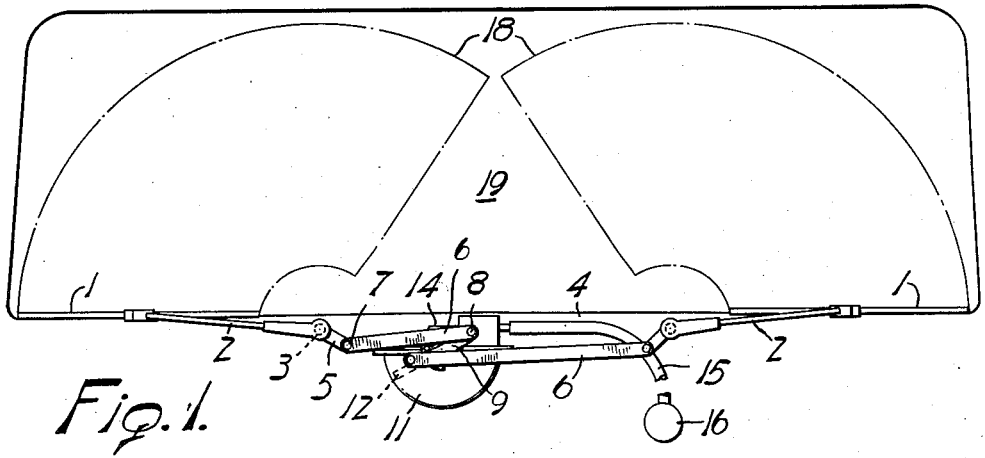
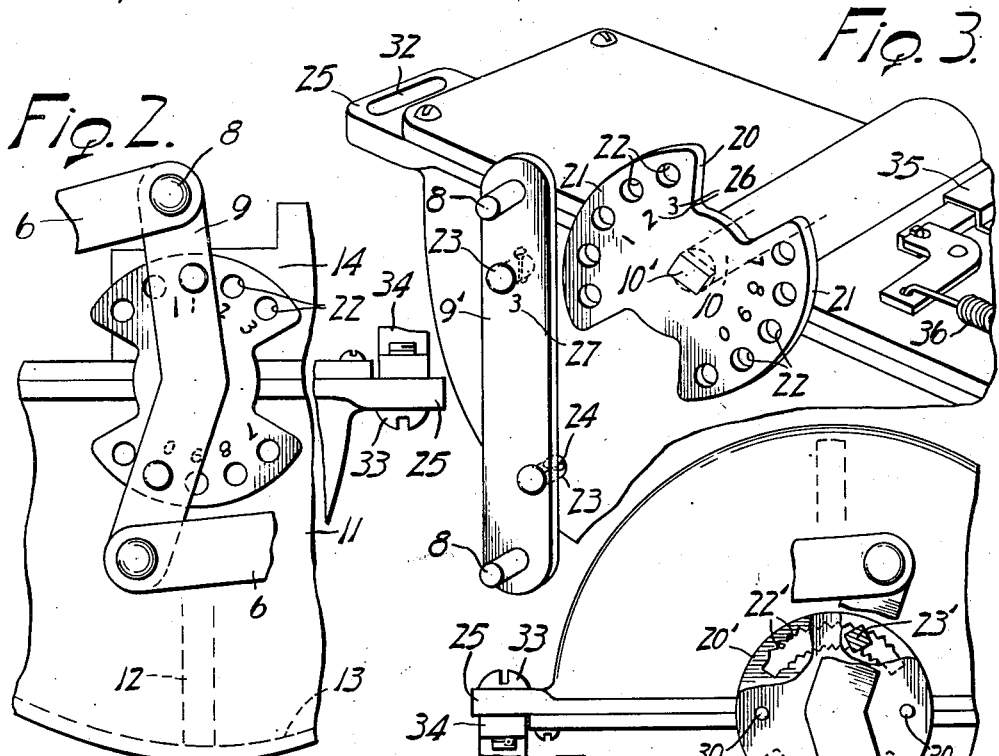
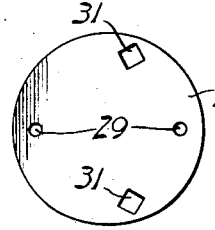
INVENTOR
John R. Oishei
BY Bean, Brooks, Buckley & Bean
ATTORNEYS Patented Sept. 2, 1952

2,608,707

UNITED STATES PATENT OFFICE 2,608,707

WINDSHIELD CLEANER

John R. Oishei, Buffalo, N. Y.

Application November 8, 1949, Serial No. 126,190

6 Claims. (Cl. 15—255)

This invention relates to the windshield cleaning art, and especially to the type in which the cleaner motor is mounted behind the instrument panel and linked together to the spaced wiper shafts for oscillating a pair of wipers on the windshield surface for cleaning the predetermined areas to maintain clear fields of vision ahead.

In this general type of windshield cleaner, the motor has been mounted in different locations and varying angular dispositions in order to accommodate the other automotive accessories in the confined quarters behind the instrument panel. For some cars the windshield cleaner motor is disposed in an upright position, while in others the motor may be tilted to one side or the other, or even inverted. Again, the wiper motor may be mounted in an elevated or lowered position, and centrally of the windshield or to one side or the other thereof. These multiple arrangements and dispositions have been carried out in an endeavor best to suit the windshield cleaner to the specifications and requirements for the particular car model in order to obtain the greatest efficiency from the cleaner system. For example, in certain of the present day motor vehicles the shaft of the windshield cleaner motor has a double throw crank arm or lever fixed thereon and the opposite ends of this lever are joined by links to the wiper actuating shafts, the arrangement being such that when the motor shaft is oscillated, the wiper shafts will likewise be oscillated to swing the wiper blades either in unison or toward and from each other and to normally park the wipers down against the lower molding of the windshield. One installation may differ from the other, on two different models of cars, solely in the shape of the double throw crank or lever which is fixed to the motor shaft. It is therefore quite obvious that in order to equip the many styles and makes of motor vehicles, numerous windshield cleaner motors must be provided that are identical in general makeup, but specifically different more or less in the shape of the driving lever.

The object of the present invention is primarily to economize in the overall number of special motors required for the various makes of automobiles and vehicles, and consequently the invention is found to reside in a new and improved windshield cleaner which embodies a flexibility in design that will facilitate the installation of the cleaners on vehicles.

Further, an object of the invention is to provide a windshield cleaner of more or less universal application which has a selectivity of part arrangements that will enable an accurate installation with factory-prescribed precision.

A further object of the invention is to provide a windshield cleaner in which the mounting of the motor and its control likewise possess a flexibility in adjustment to secure the purpose of the invention with facility.

The foregoing and other objects will manifest themselves as the following description progresses, reference being had to the accompanying drawing, wherein Fig. 1 is a diagrammatic lay-out of a windshield cleaner embodying the present invention;

Fig. 2 is a fragmentary view of the windshield cleaner motor showing one of the wiper path-locating levers;

Fig. 3 is an exploded view showing a path-locating lever of different design with its cooperating driving crank member;

Fig. 4 is a further illustration of another design of lever embodying a modified form of connection with the driving crank member; and Fig. 5 is a plan view of a templet employed to facilitate the selection of the proper lever for the particular installation.

Referring more particularly to the drawing, the numeral 1 designates spaced wiper blades, each carried by an arm 2 fixed on a shaft 3 which is journaled in the molding or windshield framing 4 for oscillatory movement. Each arm is provided with a crank arm 5 to which one end of a reciprocatory link 6 is pivotally connected as at 7. The opposite end of each link is pivotally connected by the pin 8 to one end of a double throw crank or lever 9 which latter is operable by the shaft 10 of the windshield cleaner motor 11. The motor may be powered from a suitable source, the one illustrated being suction actuated, and to this end such motor comprises a vane-like piston 12 which is fixed on the motor shaft 10 for oscillating within a chamber 13 under the pressure impulses applied thereto in alternate directions through automatic valve mechanism generally indicated at 14, all in a well known manner. The windshield cleaner motor is connected by a conduit 15 to a source of pressure or suction, such as the intake manifold 16 of the motor vehicle engine 17. When the windshield cleaner is operating, the oscillatory motion of the motor shaft 10 will reciprocate the connecting links 6 in opposite directions and impart oscillatory movement to the wiper arms 2 for effecting a sweeping action of the wiper blades 1 substantially in the paths indicated by the broken lines 18 in Fig. 1.

In the installation depicted in Fig. 1, the windshield cleaner 11 is shown in what might be termed an upright position, and the double throw lever 9 employed therein is shaped like that shown in Fig. 2. Installations in other models of automobiles may necessitate the windshield cleaner motors to be lowered from the position shown, or may be shifted laterally one way or another, which new location will result in an angular displacement of the motor shaft 10 about one or the other of the wiper actuating shafts 3 and a consequential change in the angular relationship between the two arms of the lever 9. Heretofore a change in such circumstances has made it necessary to provide a different motor for each installation because the lever was permanently attached to the motor shaft. In other installations the requirements necessitate the motor being tilted clockwise or counterclockwise within the confined quarters behind the instrument panel and, of course, any such tilting of the motor alters the relation between the components of the windshield cleaner organization and compels a new motor with its newly fixed lever. Certain motor car specifications require the windshield cleaner motor to be inverted, as shown in Fig. 4.

It therefore becomes quite apparent that numerous models of windshield cleaner motors must be made and kept in stock.

In the drawing, three different shapes of levers are shown at 9, 9′ and 9″. Numerous other shapes are required to meet the demands of the motor vehicle manufacturers. Such levers constitute adaptor keys for their own specific use.

The present invention simplifies this procedure and reduces the number of different models of motors required by making these key levers 9, 9′, 9″ interchangeable. For a given type motor there will be a set of individually different key levers from which a selection is made to adapt the motor to the particular installation. The types of motors are based on power requirements, control valve styles, and the like, and may necessitate a different set of key levers for each type in order to secure the predetermined wiper paths on the windshield 19. To this end means are provided for securing not only an adjustment of the lever with respect to the motor shaft 10, but also the predetermined relationship between the arms of the lever. While this may be accomplished in different ways, two embodiments of the invention are herein depicted.

In the embodiment illustrated in Figs. 1, 2 and 3, a driving crank member 20, herein depicted as a plate or disk, is fixed on the motor shaft 10 and preferably has oppositely extending crank portions 21 each provided with a series of seats 22. The seats may be arranged in concentric groups about the shaft axis for selective engagement by the set of key levers. However, the selective engagement is so designed that preferably a selected lever can have only one position on the motor shaft. The key levers may be so shaped that their angularly related arms will assume true radial positions with respect to the motor shaft axis. Each arm of a key lever preferably has a seat engaging pin 23 for engagement with the proper one of the seats 22 where it may be secured by suitable fastening means, such as a cotter pin 24.

Furthermore, the seats 22 may be suitably marked, as at 26, to distinguish them apart, and in cooperation with this identifying indicia 26 the key levers likewise may be given a key identification, such as is indicated at 27. For example, in Fig. 3, the key lever designated by the indicia 3 suggests to the mechanic the engagement of the upper pin 23 in the seat 3. As above stated, the spacing of the seats across the shaft axis is such that when the driven key lever is properly placed upon the driving lever 20 the companion pin 23 will register with its proper seat 22. Any attempt to insert the second pin in a different seat will necessitate a forced engagement, if not present an otherwise impossible situation. The pins 23 and the seats 22 therefore constitute interengaging shoulders which cooperate in accordance with the preselection.

The seats 22 are illustrated in the form of holes which provide shoulders interlockable with the shoulder-forming pins 23 on the key lever. In lieu of the apertures, the shoulders may be formed in one or both sides of an arcuate slot, as at 22′, Fig. 4. These shoulders may be angular in design and engaged by the lever pins 23′ of like shape.

Where the teeth or shoulders 22′ are exceedingly small, a templet 28 may be employed to facilitate placement of the key lever on the driving crank. This tempet may be in the form of a paper disk having small holes 29 for receiving the pilot pins 30 on the driving crank 20′, following which the lever pins 23′ will be passed through the holes 31 in the templet as a guide.

The constructions above set forth are practical in that they facilitate the proper installation of the windshield cleaner so as to secure the paths of the wipers as originally intended. Either pin 23 (23′) may be located toward either margin of the key lever. Likewise, the shape of the lever may be changed. The relation of these three variables constitutes the distinguishing characteristics of the key lever and determines the location of the wiper paths. However, such key levers may be in the form of circular disks in which event the effective shape of the levers will be delineated by the location of the pivots 8.

Furthermore, in these constructions the wiper motor may be removed without disturbing the connections between the key lever and the links 6 or between the links and the wiper shafts, and vice versa. This not only facilitates and expedites the installation, but also the repair of the windshield cleaner assemblage. The links may be rigid, as shown, or they may be flexible links or cables arranged in a well known and commercially used manner.

Further flexibility of installation is afforded by having the motor mounting ears 25 formed with slots 32 to slidably receive the fasteners 33 by which the motor is mounted for adjustment on a supporting body part or bracket 34. This mounting enables the transmission linkage to be properly disposed and alined.

In keeping with the purpose and aim of this invention the control valve 35 for opening and closing the pressure line 15 is flexibly extended to a point accessible to the motorist, as by a Bowden wire 36.

While the foregoing description has been given in detail, it is without thought of limitation since the inventive principles involved are capable of assuming other physical embodiments without departing from the spirit of the invention and the scope of the appended claims.

What is claimed is:

1. A windshield cleaner comprising spaced wipers, oscillatory actuating shafts therefor, an interposed oscillatory drive shaft, a pair of reciprocatory links each connected at its outer end to a respective wiper shaft for oscillating it, a double throw crank member fixed to the drive shaft having selective sets of cooperating seats on the crank member, and replaceable key levers each having parts engageable in only one set of seats differing from the sets of seats engaged by the other key levers for selectively determining the path of the wipers.

2. A windshield cleaner comprising spaced wipers, oscillatory actuating shafts therefor, an interposed oscillatory drive shaft, a pair of reciprocatory links each connected at its outer end to a respective wiper shaft for oscillating it, a double throw crank member fixed to the drive shaft having selective sets of cooperating seats on the crank member, and interchangeable key levers each having spaced parts engageable with a given set of seats and another part serving to axially aline the key lever with the drive shaft.

3. A windshield cleaner motor having an oscillatory shaft with angularly spaced crank portions fixed thereon, each crank portion having an arcuate series of seats, and wiper-path determining levers each engageable with only a predetermined seat on each crank portion for locating the path of the wiper on a windshield.

4. A windshield cleaner motor having an oscillatory shaft with angularly spaced crank portions fixed thereon, each crank portion having an arcuate series of seats, and wiper-path determining levers each engageable with only a predetermined seat on each crank portion for locating the path of the wiper on a windshield, each lever having means for axially alining it with the shaft.

5. A windshield cleaner installation comprising, in combination with a supporting vehicle structure, spaced wiper shafts journaled on the structure, a motor having an oscillatory driving lever, a plurality of interchangeable driven levers, links operatively connecting the wiper shafts to a predetermined selected one of the driven levers, and cooperative mens removably and operatively placing the selected driven lever upon the driving level in accordance with the selection for being oscillated thereby over the predetermined path.

6. A windshield cleaner installation comprising, in combination with a supporting vehicle structure, spaced wiper shafts journaled on the structure, a fluid motor having an oscillatory driving lever, a plurality of interchangeable driven levers, links operatively connecting the wiper shafts to the selected one of the driven levers, means removably and operatively placing the selected driven lever axially upon the driving lever for being oscillated thereby, said means including interengaging shoulders on the drive and driven levers cooperating in accordance with the preselected driven lever to secure the predetermined path for the connected wiper.

JOHN R. OISHEI.

REFERENCES CITED

The following references are of record in the file of this patent:

UNITED STATES PATENTS

| Number | Name | Date |
| --- | --- | --- |
| 2,059,509 | Dykstra | Nov. 3, 1936 |
| 2,298,197 | Coffey | Oct. 6, 1942 |
| 2,298,484 | Horton | Oct. 13, 1942 |